(12) United States Patent
Chen et al.

(10) Patent No.: US 9,965,503 B2
(45) Date of Patent: May 8, 2018

(54) DATA CUBE GENERATION

(71) Applicant: International Business Machines Corporation, Armonk, NY (US)

(72) Inventors: Yao Liang Chen, Beijing (CN); Wei Shan Dong, Beijing (CN); Wen Ting Mo, Beijing (CN); Chunhua Tian, Beijing (CN); Wen Yi Xiao, Beijing (CN); Junchi Yan, Shanghai (CN); Chao Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 14/825,132

(22) Filed: Aug. 12, 2015

(65) Prior Publication Data
US 2017/0046370 A1   Feb. 16, 2017

(51) Int. Cl.
*G06F 17/30* (2006.01)

(52) U.S. Cl.
CPC .. *G06F 17/30333* (2013.01); *G06F 17/30572* (2013.01)

(58) Field of Classification Search
CPC .................................................. G06F 17/30333

USPC .................................................. 707/741, 769
See application file for complete search history.

(56) References Cited

U.S. PATENT DOCUMENTS

| 7,707,143 | B2 | 4/2010 | Bruce et al. |
| 7,716,167 | B2 | 5/2010 | Colossi et al. |
| 2012/0179644 | A1 | 7/2012 | Miranker |
| 2013/0132420 | A1* | 5/2013 | Vainer ............... G06F 17/30398 707/769 |
| 2014/0122415 | A1 | 5/2014 | Chen et al. |

FOREIGN PATENT DOCUMENTS

CN   103927337 A   7/2014

* cited by examiner

*Primary Examiner* — Chelcie Daye
(74) *Attorney, Agent, or Firm* — Robert C. Bunker (57) ABSTRACT

Disclosed are a computer-implemented method for generating a data cube from data, a system and a computer program product. The method comprises selecting a candidate granularity from a plurality of candidate granularities determined for a dimension of the data cube, where a data distribution obtained in the selected candidate granularity satisfies a predetermined condition; and generating the data cube based on the selected candidate granularity for the dimension.

17 Claims, 2 Drawing Sheets

DATA CUBE GENERATION

BACKGROUND

The present disclosure relates to data visualization, and more specifically, to a computer-implemented method, a system and a computer program product for generating a data cube from data such as transaction data.

With development of e-commerce, massive transactions occur every day and a huge number of transaction data are generated. The transaction data include various attributes regarding the transactions, and may be stored in a fact table. The attributes may include, for example, a time attribute indicating time when the transactions occur, a geographical location attribute indicating geographical locations where the transactions occur, a transaction amount attribute indicating amounts of the transactions, and the like.

In order to analyze the transaction data in the fact table to find a rule inherent in the data, such as a rule regarding purchases performed by people in different countries or regions over time, visualization of the transaction data is often performed. A data cube is widely used for such visualization. The data cube may have a plurality of dimensions associated with the attributes of the transaction data. Each dimension corresponds to one attribute. In each dimension of the data cube, the transaction data (or the transactions) are aggregated in a granularity so that a data distribution in that dimension may be obtained. For example, the data cube may include three dimensions including a time dimension, a geographical location dimension and a transaction amount dimension, which may correspond to x, y, and z axes of a three-dimensional coordinate system. In the time dimension, the transaction data may be aggregated in a granularity of days at which the transactions occur, so that a transaction data distribution in terms of days may be shown in this dimension. Similarly, in the geographical dimension, the transaction data may be aggregated according to in a granularity of cities at which the transactions occur, so that a transaction data distribution in terms of cities may be shown in this dimension.

A challenging problem for generating the data cube is to select a proper granularity for data aggregation in each dimension for the data cube. Specifically, there may be many selectable granularities for each dimension. For example, since there are at least seven time units including seconds, minutes, hours, days, weeks, months and years, the time dimension may have seven selectable granularities including a second granularity, a minute granularity, an hour granularity, a day granularity, a week granularity, a month granularity and a year granularity, so that the data may be aggregated in one of the seven granularities in the time dimension. If the granularity is not properly selected so that the data are not aggregated in a proper granularity, the rule inherent in the transaction data may be not clearly shown by the data cube.

A conventional method to select the granularities for the dimensions of the data cube is to set manually by a user a series of rules so that the granularities are selected according to the rules. However, this method requires the user to input many rules, which is cumbersome. Moreover, if the user is not experienced, the rules set by the user may be not proper, which in turn renders that the selected granularities and accordingly the data cube generated are not optimal.

SUMMARY

According to an embodiment of the present disclosure, there is provided a computer-implemented method for generating a data cube from data. A candidate granularity is selected from a plurality of candidate granularities determined for a dimension of the data cube, where a data distribution obtained in the selected candidate granularity satisfies a predetermined condition. The data cube is then generated based on the selected candidate granularity for the dimension.

According to another embodiment of the present disclosure, there is provided a system for generating a data cube from data, comprising one or more processors, a memory coupled to at least one of the processors, and a set of computer program instructions stored in the memory. When executed by at least one of the processors, the set of computer program instructions perform following actions. A candidate granularity is selected from a plurality of candidate granularities determined for a dimension of the data cube, where a data distribution obtained in the selected candidate granularity satisfies a predetermined condition. The data cube is then generated based on the selected candidate granularity for the dimension.

According to a yet another embodiment of the present disclosure, there is provided a computer program product for generating a data cube from data. The computer program product comprises a computer readable storage medium having thereon first program instructions, second program instructions and third program instructions. The first program instructions are executable by a processor to cause the processor to select a candidate granularity from a plurality of candidate granularities determined for a dimension of the data cube, where a data distribution obtained in the selected candidate granularity satisfies a predetermined condition. The second program instructions are executable by the processor to cause the processor to generate the data cube based on the selected candidate granularity for the dimension.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

Figure 1:
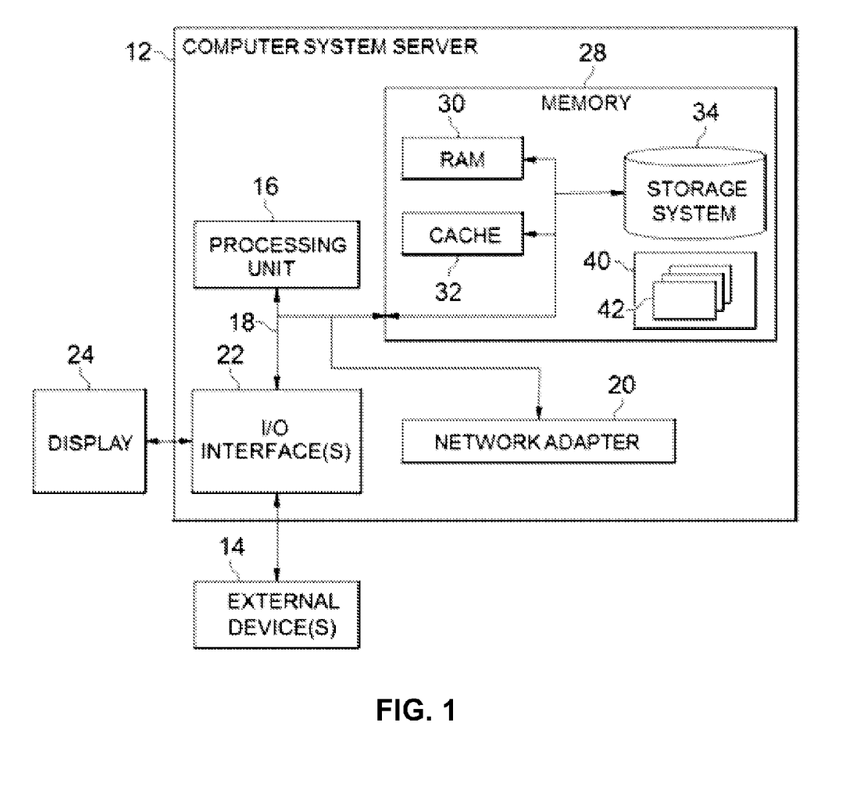
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, a computer-implemented method for generating a data cube from data according to an embodiment of the present disclosure, a system for generating a data cube from data according to an embodiment of the present disclosure, and a computer program product for generating a data cube from data according to an embodiment of the present disclosure will be described with reference to attached drawings.

For convenience of description, the embodiments of the present disclosure will be described in connection with an example where the data from which the data cube is generated are transaction data generated by an e-commerce company. It is to be appreciated that the data are not limited to the transaction data, and may be any other types of data such as electricity consumption data of cities, power consumption amounts of devices, populations of countries in different time, or the like. Additionally, the data may be discrete data such as data related to geographical locations, or continuous data such as time series data.

In the example where the transaction data is taken as an example of the data from which the data cube is generated, as described above, the transaction data may include various attributes regarding related transactions, including a time attribute indicating time at which the transactions occur, a geographical location attribute indicating geographical locations where the transactions occur, a transaction amount attribute indicating amounts of the transactions, and a product category attribute indicating categories of products involved in the transactions, or the like. An attribute may correspond to a dimension, so that there are various dimensions. A user may select one, two or more dimensions, so that the data cube may be generated based on the selected dimensions. The user may perform the selection according to various factors, such as actual needs, interests of the user, or the like.

Now, the computer-implemented method for generating a data cube from data according to an embodiment of the present disclosure will be described with reference FIG. 2.

Figure 2:
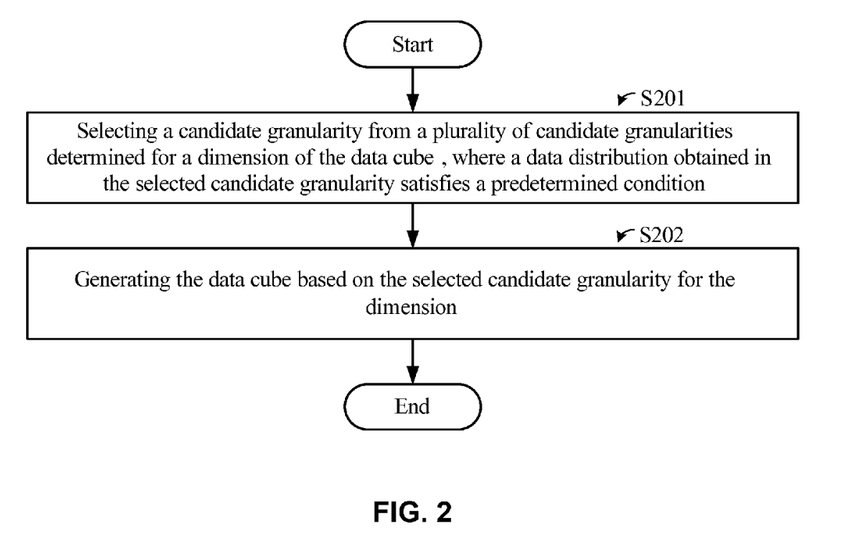
FIG. 2 shows a flow diagram for a computer-implemented method for generating a data cube from data according to an embodiment of the present disclosure.

As shown in FIG. 2, in step S201, a candidate granularity may be selected from the plurality of candidate granularities for the dimension, where a data distribution obtained in the selected candidate granularity satisfies a predetermined condition.

Specifically, a plurality of candidate granularities for a dimension of the data cube may be determined firstly. The dimension herein may be each of the dimensions selected by the user.

As described above, each dimension may correspond to a plurality of selectable granularities for aggregating or classifying the transaction data in that dimension. The plurality of selectable granularities may act as candidate granularities. Additionally, each candidate granularity may include a plurality of divisional units for dividing/aggregating the data. For example, the city granularity may include the division units of Beijing, Shanghai and Guangzhou, and when the transaction data are aggregated in the city granularity, the transaction data may be divided into transaction data for transactions occurring in Beijing, transaction data for transactions occurring in Shanghai and transaction data for transactions occurring in Guangzhou.

The plurality of candidate granularities for the dimension of the data cube may be determined in various manners. In an implementation, the plurality of candidate granularities for the dimension may be determined according to a public database from which different aggregation granularities of the transaction data may be derived. An example of such a database may be a FreeBase database at www.freebase.com. This database records, for example, respective countries in the world, provinces of the respective countries, cities in the respective provinces, etc., accordingly affiliation relationship among the countries, the provinces and the cities may be known from the database. Therefore, it may be known that the transaction data may be aggregated in a granularity of the provinces or the cities included in the provinces, and the candidate granularities for the geographical location dimension may be determined as a province granularity in which the transaction data are aggregated according to provinces and a city granularity in which the transaction data are aggregated according to cities. The database may also include other information, for example information on hierarchical categories of products, such as clothes including coats and trousers, shoes including sandals and gym shoes, and so on, so that the candidate granularities for a product category dimension may be determined according to this information. In another implementation, the plurality of candidate granularities for the dimension may be determined by the user. Specifically, the user may specify the candidate granularities for the dimension directly. For example, the user may specify a day granularity, a month granularity and a year granularity as the candidate granularities for the time dimension directly. This implementation may also be adopted when the database described above cannot be found or the database does not include related information about a certain dimension.

After the determination of the plurality of candidate granularities for the dimension, a candidate granularity may be selected from the plurality of candidate granularities, where the data distribution obtained in the selected candidate granularity satisfies the predetermined condition as described above.

Briefly, it is necessary to select a best candidate granularity from the plurality of candidate granularities for each dimension, so that the data distribution obtained in the selected granularity may render a desired rule inherent in the transaction data to be found out easily. The predetermined condition is set for this purpose, and may be any proper condition as long as it can evaluate the data distribution obtained in the selected granularity.

Specifically, an index of a data distribution obtained in each candidate granularity of the dimension may be calculated. Then, it may be determined whether the index satisfies the predetermined condition. If the index satisfies the predetermined condition, the candidate granularity may be selected as the granularity to be used in the data cube. The index of the data distribution may be determined in advance according to actual needs.

In a first implementation, the data distribution obtained in each candidate granularity is obtained by aggregating the transaction data in the each candidate granularity, and the index is periodicities of the data distribution for different time periods. This is because if the data distribution exhibits a clear periodicity, the rule inherent in the transaction data is more obvious. The different time periods may have a same length.

In this implementation, it may be determined that the index satisfies the predetermined condition if the periodicities of the data distribution obtained by aggregating the transaction data in each candidate granularity for the different time periods have a similarity degree greater than a threshold (called a first threshold below). The first threshold may be set to any proper value according to actual needs.

Specifically, assume that the candidate granularities for the geographical location dimension include a city granularity and a province granularity. In the geographical location dimension, the transaction data in the different time periods may be aggregated in each candidate granularity, obtaining the data distributions for the different time periods. Specifically, for the city granularity, the transaction data in a first time period may be aggregated or classified in a granularity of cities, i.e. according to cities in which the transactions occur, so that a data distribution in terms of cities for the first time period may be obtained. The first time period may be, for example, a first year. The data distribution for the first time period may be represented as a first curve. Additionally, the transaction data in a second time period may be aggregated or classified according to cities in which the transactions occur, so that a data distribution in terms of cities for the second time period may be obtained. The second time period may be, for example, a second year. The data distribution for the second time period may be represented as a second curve. Then, a similarity degree between the first curve and the second curve may be calculated. If the similarity degree is greater than the first threshold, the two curves are similar to each other, which means that the data distribution obtained in this city dimension exhibits a periodicity. Therefore, it may be determined that the predetermine condition is satisfied, and thus the city granularity may be selected as the granularity to be used in the data cube. Similarly, for the province granularity, the transaction data in a first time period may be aggregated or classified in a granularity of provinces, i.e. according to provinces in which the transactions occur, so that a data distribution in terms of provinces for the first time period may be obtained and represented as a third curve. Additionally, the transaction data in a second time period may be aggregated or classified according to provinces in which the transactions occur, so that a data distribution in terms of provinces for the second time period may be obtained and represented as a fourth curve. Then, a similarity degree between the third curve and the fourth curve may be calculated. If the similarity degree is greater than the first threshold, the two curves are similar to each other, which means that the data distribution obtained in this province granularity exhibits a periodicity. Therefore, it may be determined that the predetermine condition is satisfied, and thus the province granularity may be selected as the granularity to be used in the data cube. It is to be noted that, if both the city granularity and the province granularity may be selected in the manner described above, one of them may be selected as the granularity to be used. In this case, either one of them may be selected as the granularity to be used, or one of them corresponding to a more obvious periodicity may be selected as the granularity to be used. For example, if the similarity degree calculated for the city granularity is larger than that calculated for the province granularity, the city granularity corresponds to a more obvious periodicity. The similarity degree between two curves may be calculated in various manners known in the art. For example, differences between corresponding points (such as points corresponding the same cities in the case of the city granularity) of the two curves may be calculated, and then an average of the differences may be calculated as a measure of the similarity degree between the two curves.

As another example, assume that the candidate granularities for the time dimension include a day granularity and a month granularity. It may be determined whether the data distribution obtained by aggregating the data in the day granularity is periodic. If so, it may be determined that the predetermine condition is satisfied, and the day granularity may be selected as the granularity to be used, otherwise the day granularity should not be selected. Additionally, it may be determined whether the data distribution obtained by aggregating the data in the year granularity is periodic. If so, it may be determined that the predetermine condition is satisfied, and the year granularity may be selected as the granularity to be used, otherwise the year granularity should not be selected. It is to be noted that, if both the data distribution obtained by aggregating the data in the day granularity and the data distribution obtained by aggregating the data in the year granularity are periodic, either of the day granularity and the year granularity may be selected, or one of the day granularity and the year granularity whose periodicity is more obvious may be selected.

In a second implementation, the data distribution obtained in each candidate granularity is obtained by aggregating the data based on the each candidate granularity, and the index is a distinction degree between different segments of the data distribution. This is because if different segments of the data distribution differ from each other obviously, the obvious difference between the segments may reflect some rule inherent in the transaction data. In contrast, if different segments of the data distribution are all similar or identical to each other, it is difficult to find the rule inherent in the transaction data. In this implementation, the distinction degree is used to measure the difference between the segments. It may be determined that the index satisfies the predetermined condition if the distinction degree between different segments of the data distribution obtained by aggregating the data in the candidate granularity is greater than a threshold (called a second threshold below). The second threshold may be set according to actual needs.

Specifically, in the example where that the candidate granularities for the geographical location dimension include the city granularity and the province granularity, a data distribution may be obtained by aggregating the data in the city granularity. Then, it may be determined whether a distinction degree between different segments of the data distribution is greater than the second threshold. The different segments may be selected from all segments of the data distribution, each of which corresponds to a division unit of the city granularity, i.e. a city. For example, if the cities include Beijing, Shanghai and Guangzhou, segments corresponding to any two of the three cities may be selected to see whether a distinction degree between the two segments is greater than the second threshold. For example, a segment corresponding to Beijing and a segment corresponding to Shanghai may be selected to see whether a distinction degree between the two segments is greater than the second threshold. If the distinction degree between the two segments is greater than the second threshold, it may be determined that the predetermined condition is satisfied, and the city granularity may be selected as the granularity to be used. Additionally, a data distribution may be obtained by aggregating the data in the province granularity. Then, it may be determined whether a distinction degree between different segments of the data distribution is greater than the second threshold. The different segments may be selected from all segments of the data distribution, each of which corresponds to a division unit of the province granularity, i.e. a province. For example, if the provinces include Shandong, Guangdong and Zhejiang, segments corresponding to any two of the three provinces may be selected to see whether a distinction degree between the two segments is greater than the second threshold. For example, a segment corresponding to Shandong and a segment corresponding to Guangdong may be selected to see whether a distinction degree between the two segments is greater than the second threshold. If the distinction degree between the two segments is greater than the second threshold, it may be determined that the predetermined condition is satisfied, and the province granularity may be selected as the granularity to be used. It is to be noted that, if both the city granularity and the province granularity can be selected in the above manner, either of the two granularities may be selected as the granularity to be used, or one of the two granularities which has a larger distinction degree may be selected as the granularity to be used. The distinction degree between the two segments may be calculated in various manners known in the art. For example, a variance between the two segments which are represented as curves may be calculated as a measure of the distinction degree.

In a third implementation, the data distribution obtained in each candidate granularity includes data distributions associated with a same time period, which correspond to different division units of the each candidate granularity, and the index is a correlation degree between the data distributions associated with the same time period. In this case, it may be determined that the index satisfies the predetermined condition if the correlation degree satisfies a predetermined relation. The predetermined relation may be determined according to actual needs. For example, the predetermined relation may be determined so that the index satisfies the predetermined condition if the correlation degree is greater than a third threshold. Alternatively, the predetermined relation may be determined so that the index satisfies the predetermined condition if the correlation degree is smaller than a fourth threshold. The third threshold and the fourth threshold may be set to any proper values according to actual needs.

Specifically, assume that the candidate granularity for the geographical location dimension includes the city granularity including the division units of Beijing and Shanghai and the province granularity including the division units of Shandong and Guangdong. A data distribution associated with one year, which corresponds to Beijing, may be obtained from the transaction data in the one year for Beijing, and a data distribution associated with a same one year, which corresponds to Shanghai, may be obtained from the transaction data in the one year for Shanghai. Then, a correlation degree between the two data distributions may be calculated. If the correlation degree satisfies the predetermined relation, the city granularity is selected as the granularity to be used in the data cube. Additionally, a data distribution associated one year, which corresponds to Shandong, may be obtained from the transaction data in the one year for Shandong, and a data distribution associated with the same one year, which corresponds to Guangdong, may be obtained from the transaction data in the one year for Guangdong. Then, a correlation degree between the two data distributions may be calculated. If the correlation degree satisfies the predetermined relation, the province granularity may be selected as the granularity to be used. It is to be noted that if both the city granularity and the province granularity may be selected in the above manner, either of them may be selected as the granularity to be used, or one of them which has a correlation degree satisfying the predetermined relation more may be selected as the granularity to be used. For example, if the predetermined relation may be determined so that the index satisfies the predetermined condition when the correlation degree is greater than a third threshold, one of the selectable granularities which corresponds to a larger correlation degree may be considered as the granularity which has a correlation degree satisfying the predetermined relation more and thus may be selected as the granularity to be used. In contrast, if the predetermined relation may be determined so that the index satisfies the predetermined condition when the correlation degree is smaller than a fourth threshold, one of the selectable granularities which corresponds to a smaller correlation degree may be considered as the granularity which has a correlation degree satisfying the predetermined relation more and thus may be selected as the granularity to be used. Additionally, the correlation degree between two data distributions may be calculated in various manners commonly known in the art. For example, a Pearson correlation coefficient for the two distributions may be calculated as the correlation degree between two data distributions.

In a fourth implementation, for each candidate granularity, the index may be a combination of at least two of the periodicities of the data distribution obtained in the candidate granularity for different time periods, the distinction degree between different segments of the data distribution obtained in the candidate granularity, and the correlation degree between the data distributions associated with a same time period, which correspond to different division units of the each candidate granularity. For example, the three factors may be combined according to a following equation:

$$\text{Index} = a\text{Per} + b\text{Dis} + c\text{Cor}$$

where Per is a value evaluating the periodicities of the data distribution obtained in the each candidate granularity for different time periods, Dis is a value evaluating the distinction degree between different segments of the data distribution obtained in the each candidate granularity, Cor is a value evaluating the correlation degree described above, and a, b and c are weights for the three factors which may be set according to actual needs. The index may be calculated for each of the candidate granularities, and then a granularity with a largest index may be selected.

It is to be appreciated that although the determination of the plurality of candidate granularities for the dimension is described as a part of step S201, this is not limitative. In other embodiments, the determination of the plurality of candidate granularities for the dimension may be performed in advance, and a result of the determination may be stored accordingly, so that the result, i.e. the determined candidate granularities for the dimension, may be retrieved when step S201 is performed.

Continuing with FIG. 2, in step S202, the data cube may be generated in the selected granularity for the dimension.

Specifically, the data cube may be generated so that it includes all dimensions selected by the user, and in each of the dimensions, the data are aggregated in the granularity determined in step S201. A particular method for generating the data cube given the dimensions thereof and the granularity for each dimension is known in the art, thus a detailed description thereof is omitted here.

With the above method, the granularity for each dimension of the data cube may be selected automatically, and the selected granularity may satisfy a predetermined condition and thus is advantageous, accordingly the data cube generated based on the selected granularity may reflect the rule inherent in the data more clearly. Additionally, it is not necessary for the user to set many rules, which reduces a burden of the user and improves efficiency of the data analysis.

The respective embodiments for implementing the method of the present disclosure have been described with reference to the accompanying drawings hereinbefore. Those skilled in the art may understand that the above method may be implemented in software, in hardware, or in a combination thereof. Further, those skilled in the art may understand that by implementing the respective steps in the above method in software, in hardware, or in a combination thereof, a device for generating a data cube from data based on the same inventive concept may be provided. Even if a hardware configuration of the device is the same as that of a general-purpose processing device, the device will exhibit characteristics different from the general-purpose processing device due to a function of software contained therein, so as to form the device according to the embodiment of the present disclosure. The device of the present disclosure comprises a plurality of units or modules, which are configured to execute corresponding steps. Those skilled in the art may understand how to write a program to implement actions of the units or modules by reading the present specification.

Figure 3:
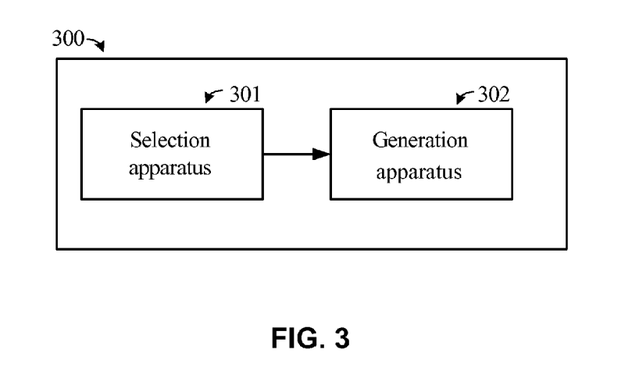
FIG. 3 shows a block diagram of a device for generating a data cube from data according to an embodiment of the present disclosure.

With reference now to FIG. 3, the device for generating a data cube from data according to an embodiment of the present disclosure will be described. Since the device and the method are based on the same inventive concept, the same or corresponding implementation details in the above method are also applicable to the device corresponding to the above method, and these implementation details will not be described below because they have been described in the above in detail and completely.

As shown in FIG. 3, the device 300 includes a selection apparatus 301 and a generation apparatus 302.

The selection apparatus 301 may select a candidate granularity from a plurality of candidate granularities determined for a dimension of the data cube, where a data distribution obtained based on the selected candidate granularity satisfies a predetermined condition.

Specifically, the selection apparatus 301 may determine the plurality of candidate granularities for a dimension of the data cube firstly. The dimension may be each dimension selected by the user as described above.

As described above, the selection apparatus 301 may determine the plurality of candidate granularities of the data cube which correspond to each attribute in various manners. In an implementation, the selection apparatus 301 may determine the plurality of candidate granularities according to a public database from which different aggregation granularities of the transaction data may be derived. In another implementation, the selection apparatus 301 may determine the plurality of candidate granularities according to an input of the user.

Then, the selection apparatus 301 may select a candidate granularity from the plurality of candidate granularities determined for the dimension, where the data distribution obtained based on the selected candidate granularity satisfies the predetermined condition as described above. The predetermined condition may be any proper condition as long as it can evaluate the data distribution obtained in the selected granularity.

Specifically, with respect to the plurality of candidate granularities for each dimension, the selection apparatus 301 may calculate an index of a data distribution obtained in each candidate granularity. Then, the selection apparatus 301 may determine whether the index satisfies the predetermined condition. If the index satisfies the predetermined condition, the selection apparatus 301 may select the candidate granularity as the granularity as the granularity to be used in the data cube. The index of the data distribution may be determined in advance according to actual needs.

In a first implementation, the data distribution obtained in each candidate granularity is obtained by aggregating the transaction data in the each candidate granularity, and the index is periodicities of the data distribution for different time periods.

As an example, the selection apparatus 301 may determine that the index satisfies the predetermined condition if the periodicities of the data distribution for the different time periods have a similarity degree greater than the first threshold. The first threshold may be set to any proper value according to actual needs. The selection apparatus 301 may make the determination in the manner described above with reference to FIG. 2, thus a detailed description thereof is omitted here.

In a second implementation, the data distribution obtained in each candidate granularity is obtained by aggregating the transaction data in the each candidate granularity, and the index may be a distinction degree between different segments of the data distribution. In this implementation, the selection apparatus 301 may determine that the index satisfies the predetermined condition if the distinction degree between different segments of the data distribution obtained by aggregating the data based on a candidate granularity is greater than the second threshold. The second threshold may be set according to actual needs.

In a third implementation, the data distribution obtained in each candidate granularity includes data distributions associated with a same time period, which correspond to different division units of the each candidate granularity, and the index is a correlation degree between the data distributions associated with the same time period. In this case, the selection apparatus 301 may determine that the index satisfies the predetermined condition if the correlation degree satisfies the predetermined relation described above. The predetermined relation may be determined according to actual needs. For example, the predetermined relation may be determined so that the index satisfies the predetermined condition if the correlation degree is greater than the third threshold. Alternatively, the predetermined relation may be determined so that the index satisfies the predetermined condition if the correlation degree is smaller than the fourth threshold.

In a fourth implementation, for each candidate granularity, the index may be a combination of at least two of the periodicities of the data distribution obtained in the candidate granularity for different time periods, the distinction degree between different segments of the data distribution obtained in the candidate granularity, and the correlation degree between the data distributions associated with a same time period, which correspond to different division units of the each candidate granularity. The three factors may be combined in any proper way, such as in the way described above.

It is to be appreciated that although the determination of the plurality of candidate granularities for the dimension is described as being performed by the selection apparatus 301, this is not limitative. In other embodiments, the determination of the plurality of candidate granularities for the dimension may be performed by other apparatus in advance, and a result of the determination may be stored accordingly, so that the result, i.e. the determined candidate granularities for the dimension, may be retrieved by the selection apparatus 301 if needed.

The generation apparatus 302 may generate the data cube in the selected granularity for the dimension. Specifically, the generation apparatus 302 may generate the data cube so that it includes all dimensions selected by the user, and in each of the dimensions, the data are aggregated in the granularity determined by the generation apparatus 302. A particular method for the generation apparatus 302 to generate the data cube given the dimensions thereof and the granularity for each dimension is known in the art, thus a detailed description thereof is omitted here.

With this device, the data aggregation granularity in each dimension of the data cube may be selected automatically, without the need of inputting the rules for selecting the granularities manually by the user, which reduces a burden of the user and improves efficiency of the data analysis. Additionally, the selected granularity will be more proper so that the rule inherent in the data may be found out more easily through the data cube.

The present invention may be a system, a method, and/or a computer program product. The computer program product may include a computer readable storage medium (or media) having computer readable program instructions thereon for causing a processor to carry out aspects of the present invention. For example, a computer program product for generating a data cube from data may comprise a computer readable storage medium having thereon first program instructions, second program instructions and third program instructions. The first program instructions are executable by a processor to cause the processor to select a candidate granularity from a plurality of candidate granularities determined for a dimension of the data cube, where a data distribution obtained in the selected candidate granularity satisfies a predetermined condition. The second program instructions are executable by the processor to cause the processor to generate the data cube based on the selected candidate granularity for the dimension.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a data cube from data, comprising:
    selecting a candidate granularity from a plurality of candidate granularities determined for a dimension of the data cube, where a data distribution obtained in the selected candidate granularity satisfies a predetermined condition, wherein the selecting a candidate granularity from the plurality of candidate granularities for the dimension comprises:
    calculating an index of a data distribution obtained in each candidate granularity;
    determining whether the index satisfies the predetermined condition; and
    selecting the candidate granularity in response to determining that the index satisfies the predetermined condition; and
    generating the data cube based on the selected candidate granularity for the dimension.

2. The method of claim 1, wherein the data distribution obtained in each candidate granularity is obtained by aggregating the data based on the each candidate granularity, and the index is periodicities of the data distribution for different time periods.

3. The method of claim 2, wherein the determining whether the index satisfies the predetermined condition comprises:
    determining that the index satisfies the predetermined condition in response to the periodicities of the data distribution for the different time periods having a similarity degree greater than a first threshold.

4. The method of claim 1, wherein the data distribution obtained in each candidate granularity is obtained by aggregating the data based on the each candidate granularity, and the index is a distinction degree between different segments of the data distribution.

5. The method of claim 4, wherein the determining whether the index satisfies the predetermined condition comprises:
   determining that the index satisfies the predetermined condition in response to the distinction degree between the different segments of the data distribution being greater than a second threshold.

6. The method of claim 1, wherein the data distribution obtained in each candidate granularity includes data distributions associated with a same time period, which correspond to different division units of the each candidate granularity, and the index is a correlation degree between the data distributions associated with the same time period.

7. The method of claim 6, wherein the determining whether the index satisfies the predetermined condition comprises:
   determining that the index satisfies the predetermined condition in response to the correlation degree satisfying a predetermined relation.

8. A computer system for generating a data cube from data, comprising:
   one or more processors;
   a memory coupled to at least one of the processors;
   a set of computer program instructions stored in the memory, which, when executed by at least one of the processors, perform actions of:
   selecting a candidate granularity from a plurality of candidate granularities determined for a dimension of the data cube, where a data distribution obtained in the selected candidate granularity satisfies a predetermined condition, wherein the selecting a candidate granularity from the plurality of candidate granularities for the dimension comprises:
   calculating an index of a data distribution obtained in each candidate granularity;
   determining whether the index satisfies the predetermined condition; and
   selecting the candidate granularity in response to determining that the index satisfies the predetermined condition; and
   generating the data cube based on the selected candidate granularity for the dimension.

9. The computer system of claim 8, wherein the data distribution obtained in each candidate granularity is obtained by aggregating the data based on the each candidate granularity, and the index is periodicities of the data distribution for different time periods.

10. The computer system of claim 9, wherein the determining whether the index satisfies the predetermined condition comprises:
    determining that the index satisfies the predetermined condition in response to the periodicities of the data distribution for the different time periods having a similarity degree greater than a first threshold.

11. The computer system of claim 8, wherein the data distribution obtained in each candidate granularity is obtained by aggregating the data based on the each candidate granularity, and the index is a distinction degree between different segments of the data distribution.

12. The computer system of claim 11, wherein the determining whether the index satisfies the predetermined condition comprises:
    determining that the index satisfies the predetermined condition in response to the distinction degree between the different segments of the data distribution being greater than a second threshold.

13. The computer system of claim 8, wherein the data distribution obtained in each candidate granularity includes data distributions associated with a same time period, which correspond to different division units of the each candidate granularity, and the index is a correlation degree between the data distributions associated with the same time period.

14. The computer system of claim 13, wherein the determining whether the index satisfies the predetermined condition comprises:
    determining that the index satisfies the predetermined condition in response to the correlation degree satisfying a predetermined relation.

15. A computer program product for generating a data cube from data, comprising:
    a computer readable storage medium having thereon:
    first program instructions executable by a processor to cause the processor to select a candidate granularity from a plurality of candidate granularities determined for a dimension of the data cube, where a data distribution obtained in the selected candidate granularity satisfies a predetermined condition, wherein the selecting a candidate granularity from the plurality of candidate granularities for the dimension comprises:
    calculating an index of a data distribution obtained in each candidate granularity;
    determining whether the index satisfies the predetermined condition; and
    selecting the candidate granularity in response to determining that the index satisfies the predetermined condition; and
    second program instructions executable by the processor to cause the processor to generate the data cube based on the selected candidate granularity for the dimension.

16. The computer program product of claim 15, wherein the data distribution obtained in each candidate granularity is obtained by aggregating the data based on the each candidate granularity, and the index is periodicities of the data distribution for different time periods or a distinction degree between different segments of the data distribution.

17. The computer program product of claim 15, the data distribution obtained in each candidate granularity includes data distributions associated with a same time period, which correspond to different division units of the each candidate granularity, and the index is a correlation degree between the data distributions associated with the same time period.

* * * * *